United States Patent
Sun et al.

(10) Patent No.: US 9,065,686 B2
(45) Date of Patent: Jun. 23, 2015

(54) SPUR DETECTION, CANCELLATION AND TRACKING IN A WIRELESS SIGNAL RECEIVER

(71) Applicant: QUALCOMM Incorporated, San Diego, CA (US)

(72) Inventors: Qinfang Sun, Cupertino, CA (US); Chiao-Cheng Huang, Hsinchu (TW); Hao-Jen Cheng, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/683,692

(22) Filed: Nov. 21, 2012

(65) Prior Publication Data

US 2014/0140440 A1 May 22, 2014

(51) Int. Cl.
*H03D 1/04* (2006.01)
*H04L 27/00* (2006.01)
*H04B 1/10* (2006.01)

(52) U.S. Cl.
CPC .............. *H04L 27/00* (2013.01); *H04B 1/1027* (2013.01)

(58) Field of Classification Search
None
See application file for complete search history.

(56) References Cited

U.S. PATENT DOCUMENTS

| | | | |
|---|---|---|---|
| 5,107,227 A | 4/1992 | Brooks | |
| 5,325,204 A | 6/1994 | Scarpa | |
| 5,519,890 A | 5/1996 | Pinckley | |
| 5,848,164 A * | 12/1998 | Levine | 381/61 |
| 6,961,019 B1 | 11/2005 | McConnell et al. | |
| 7,058,116 B2 | 6/2006 | Moshavi et al. | |
| 7,107,033 B2 | 9/2006 | Du Toit | |
| 7,250,887 B2 | 7/2007 | Danzig et al. | |
| 7,292,830 B1 | 11/2007 | Cheung et al. | |
| 7,720,134 B2 | 5/2010 | Tomasin et al. | |
| 7,809,094 B2 | 10/2010 | Xu et al. | |
| 7,924,904 B2 | 4/2011 | Gaikwad et al. | |
| 8,031,101 B2 | 10/2011 | Narasimhan et al. | |
| 8,055,235 B1 | 11/2011 | Gupta et al. | |
| 8,774,330 B2 * | 7/2014 | Dubey et al. | 375/343 |
| 2002/0065047 A1 | 5/2002 | Moose | |
| 2002/0130811 A1 | 9/2002 | Voigtlaender et al. | |

(Continued)

FOREIGN PATENT DOCUMENTS

CN 101521517 A 9/2009
EP 2096769 A1 9/2009

(Continued)

OTHER PUBLICATIONS

Giordanengo, Giorgio. Impact of Notch Filtering on Tracking Loops for GNSS Applications, Gennaio, 2009, 80 Pages.

(Continued)

*Primary Examiner* — Adolf Dsouza
(74) *Attorney, Agent, or Firm* — Mahamedi Paradice LLP

(57) ABSTRACT

A method and device for processing spur components associated with a received wireless signal are disclosed. In one embodiment, the method includes first selecting a sub-band of a spectral band of the received signal. The selected sub-band is scanned, and a detection routine is executed to detect a spur within the scanned sub-band having a peak magnitude above a predetermined threshold. The spur frequency is determined, and the spur may be removed by a cancellation unit based on the determined frequency. The method also includes tracking the frequency of the spur to ensure continued suppression over time and under dynamic conditions.

20 Claims, 9 Drawing Sheets

(56) References Cited

U.S. PATENT DOCUMENTS

| | | |
|---|---|---|
| 2002/0173317 A1 | 11/2002 | Nykanen et al. |
| 2003/0103445 A1 | 6/2003 | Steer et al. |
| 2003/0112905 A1 | 6/2003 | Heinzl et al. |
| 2005/0059366 A1 | 3/2005 | Choi et al. |
| 2005/0285781 A1 | 12/2005 | Park et al. |
| 2006/0133463 A1 | 6/2006 | Pietila et al. |
| 2006/0203710 A1 | 9/2006 | Mukkavilli et al. |
| 2006/0269004 A1 | 11/2006 | Ibrahim et al. |
| 2006/0281425 A1* | 12/2006 | Jungerman ............... 455/183.2 |
| 2007/0153878 A1 | 7/2007 | Filipovic |
| 2007/0296590 A1 | 12/2007 | Diorio et al. |
| 2008/0043580 A1 | 2/2008 | Kotaka et al. |
| 2008/0143580 A1 | 6/2008 | Glazko et al. |
| 2008/0146184 A1 | 6/2008 | Dessert |
| 2008/0160916 A1 | 7/2008 | Jagger et al. |
| 2009/0190633 A1 | 7/2009 | Smith |
| 2009/0191866 A1 | 7/2009 | Flore et al. |
| 2009/0238306 A1 | 9/2009 | Honda et al. |
| 2009/0257471 A1 | 10/2009 | Tanaka et al. |
| 2009/0259439 A1* | 10/2009 | Feldhaus et al. ............. 702/191 |
| 2010/0013706 A1* | 1/2010 | Sun ......................... 342/357.15 |
| 2010/0026547 A1 | 2/2010 | Weissman et al. |
| 2010/0118921 A1 | 5/2010 | Abdelmonem et al. |
| 2010/0158149 A1 | 6/2010 | Gorokhov |
| 2010/0197235 A1 | 8/2010 | Wilhelmsson |
| 2010/0234021 A1 | 9/2010 | Ngai et al. |
| 2010/0246635 A1 | 9/2010 | Ye et al. |
| 2010/0279637 A1 | 11/2010 | Umatt |
| 2010/0285769 A1 | 11/2010 | Conroy et al. |
| 2011/0142100 A1 | 6/2011 | Farmer et al. |
| 2011/0164701 A1 | 7/2011 | Nikopourdeilami et al. |
| 2011/0268206 A1 | 11/2011 | Ge et al. |
| 2011/0305306 A1 | 12/2011 | Hu et al. |
| 2012/0042193 A1 | 2/2012 | Gupta et al. |
| 2013/0208838 A1 | 8/2013 | Wu et al. |

FOREIGN PATENT DOCUMENTS

| | | |
|---|---|---|
| JP | 2009206603 A | 9/2009 |
| WO | WO-2008133751 A2 | 11/2008 |

OTHER PUBLICATIONS

Milstein, L.B., "Interference Rejection Techniques in Spread Spectrum Communications" Proceedings of the IEEE, vol. 76, Issue: 6, Jun 1988, pp. 657-671.

Wang S., et al.,"FFT Filter-Bank-Based Wideband Detection: Coherent vs. Non-Coherent Integration" International Instrumentation and Measurement Technology Conference, 2009. I2MTC '09. IEEE, May 2009.

International Search Report and Written Opinion—PCT/US2013/069950—ISA/EPO—Feb. 4, 2013.

\* cited by examiner

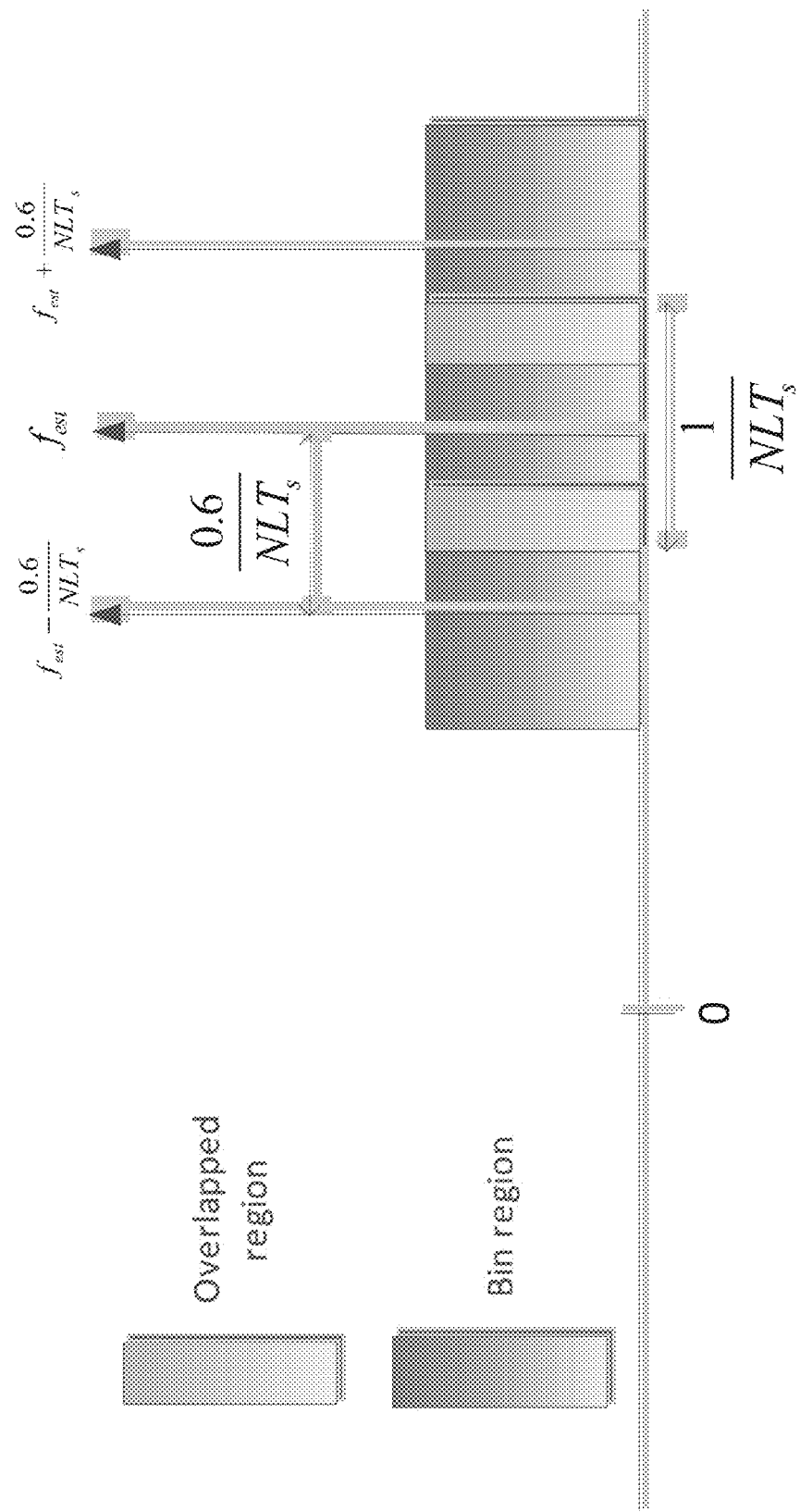

SPUR DETECTION, CANCELLATION AND TRACKING IN A WIRELESS SIGNAL RECEIVER

TECHNICAL FIELD

The present embodiments relate generally to data communications, and more particularly to methods and apparatus that provide spur detection and cancellation.

BACKGROUND OF RELATED ART

Global navigation satellite systems (GNSS), such as the Global Positioning System (GPS), Galileo and the like, generally rely on a terrestrial navigation receiver to process signals from a satellite position system ("SPS signals"). The SPS signals are usually transmitted from transmitters fixed to space vehicles (SVs) to obtain pseudo-range measurements from the terrestrial navigation receiver to the transmitters.

In many instances, the terrestrial navigation receiver may need to overcome undesired radio frequency (RF) energy in the form of radio-frequency-interference (RFI) or "spurs." The spurs take the form of narrow-band frequency signals that may result from in-band or out-of-band noise sources.

One proposed method of handling spurs involves detecting the spurs and programming spur cancellation circuits to cancel the spurs. This may be an effective way to remove the spurs. However, over time the spurs may exhibit changes in characteristics such as an offset in frequency or variable strength and bandwidth.

SUMMARY

A method and device for processing spurs associated with a received wireless signal are disclosed. In one embodiment, the method includes selecting a sub-band of a spectral band of the received signal, scanning the selected sub-band, and detecting, within the scanned sub-band, a spur having a peak magnitude above a predetermined threshold. The frequency of the spur is then determined. In some embodiments, the spur may be removed based on the spur frequency. In some embodiments, the spur frequency may be tracked over time and under dynamic conditions.

BRIEF DESCRIPTION OF THE DRAWINGS

The present embodiments are illustrated by way of example and are not limited by the figures of the accompanying drawings, where:

FIG. 9 illustrates one embodiment of overlapping frequency bands or bins for multiple frequency bin tracking operations.

DETAILED DESCRIPTION

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
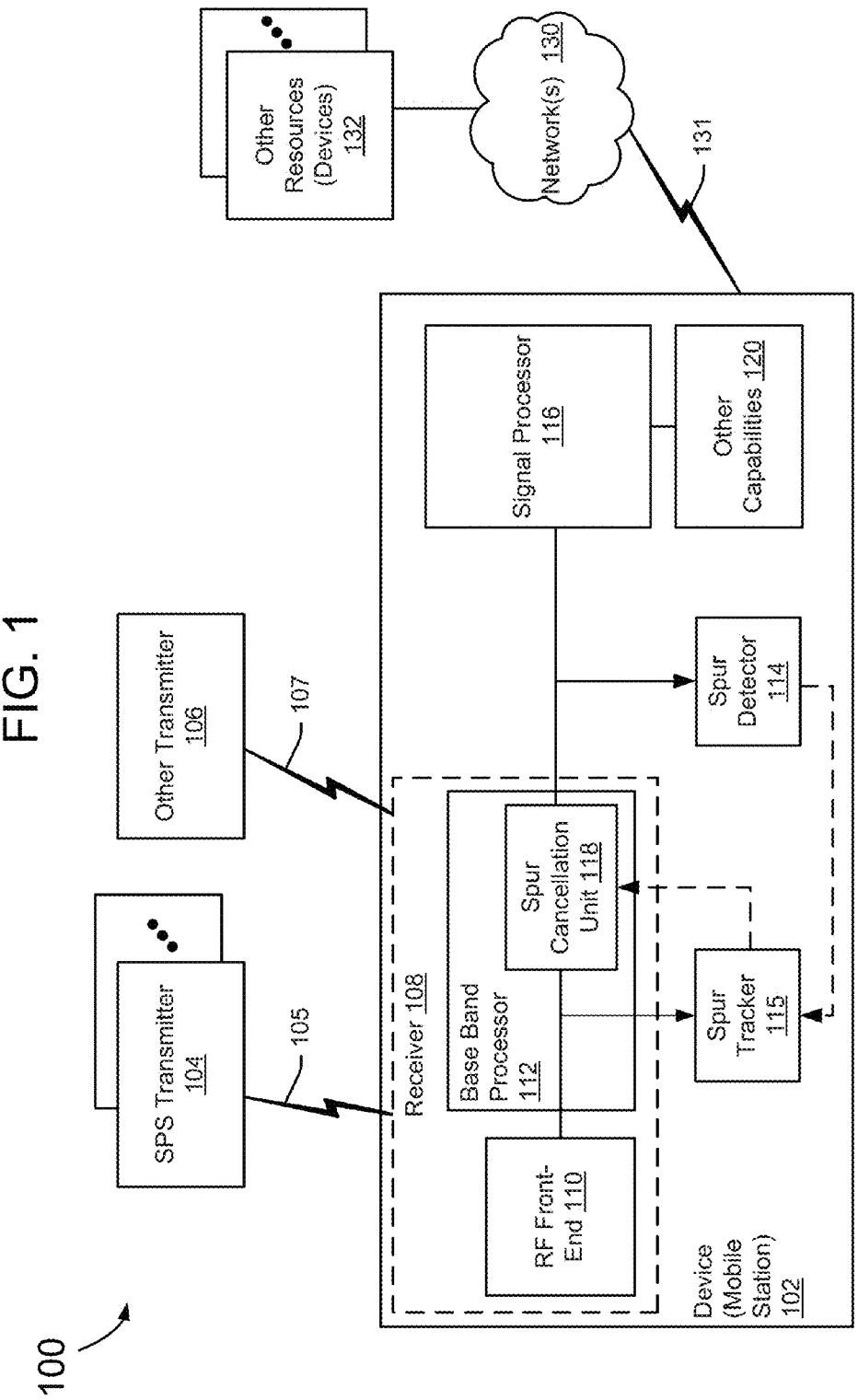
FIG. 1 illustrates one embodiment of a wireless system architecture.

More specifically, and referring generally to FIG. 1, a signaling environment 100 is shown that includes a portable electronic device, such as a mobile station 102 that receives wireless signals from various transmit sources 104, 106 and/or 130. In one embodiment, the mobile station 102 may be a computing and/or communications device such as a mobile telephone, a smart phone, a laptop computer, a tablet computer, and so forth. The mobile station 102 may perform and/or otherwise support various positioning and/or navigation functions (e.g., position estimation, velocity estimation, time estimation, tracking, routing, location-based services, etc.) based, at least in part, on one or more signals from a satellite positioning system (SPS). The mobile station 102 may include a receiver 108 that interfaces with a spur detector 114, spur tracker 115 and signal processor 116. A variety of circuitry and/or software enabling other capabilities 120 may be coupled to the signal processor 116.

Further referring to FIG. 1, the receiver 108 may include an RF front-end 110 and a baseband processor 112. The RF front-end 110 receives RF waveforms that are transmitted via one or more satellite positioning system (SPS) transmitters 104. The baseband processor 112 receives the output of the RF front-end 110 and converts the received RF signals to baseband signals. The baseband processor 112 may interface with the signal processor 116 through a spur cancellation unit 118. One embodiment of a spur cancellation unit 118 may employ notch filters as described below in further detail.

To address spur signal components that may be present in a received signal, the spur detector 114 may operate in concert with the spur tracker 115 and spur cancellation unit 118. In one embodiment, the spur detector 114 may detect one or more undesirable signals (e.g., a continuous wave signal 107 transmitted via other transmitter 106) which may interfere with the reception of one or more desired signals (e.g., SPS signal 105). The spur cancellation unit 118 coupled to the spur detector 114 may be configured to cancel spurs caused by the undesirable signals 107 from the received waveform. The spur tracker 115 may monitor detected spurs and periodically update stored information relating to dynamic frequency characteristics in each spur (such as phase, frequency and/or amplitude). This allows for a straightforward adaptive way to detect and cancel spurs over time and under changing environmental conditions (such as reception conditions, proximity to interfering devices, common spur frequencies, etc.). In FIG. 1, the solid lines between the spur detector 114, spur cancellation unit 118 and spur tracker 115 represent signal flow of input/output (I/O) samples, while the dashed lines represent the control signals, such as spur frequency values.

By detecting, tracking, and cancelling the spurs, the receiver 108 thus generates filtered signal data that may be further processed and/or otherwise used by the signal processor 116 and/or the other capabilities 120.

For example, the signal processor 116 may process the filtered data to estimate a position, location, range, velocity, and/or other information that may be beneficial in providing positioning or navigation services to a user. The other capabilities 120 may utilize the information generated by the signal processor 116 to provide a displaying capability that presents mapping or routing information to a user via an output device (not shown), and/or a network interface capability that provides communication between the mobile station 102 and one or more other resources (devices) 132, via a communication link 131 with one or more wired and/or wireless networks 130.

In one embodiment, other resources (devices) 132 may be a server, a cloud computing device, other suitable computing devices/services, or any combination thereof. The network 130 may be a telephone network, a cellular network, a local area network, a wireless local area network, an intranet, the Internet, and so forth.

Figure 2:
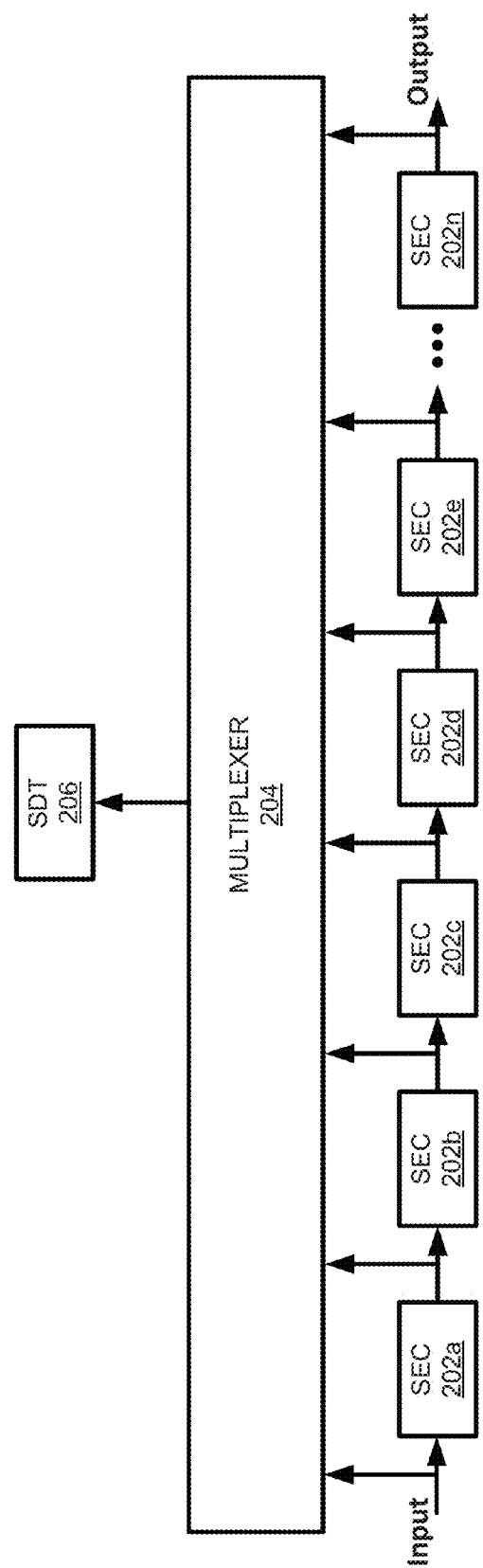
FIG. 2 shows a block diagram illustrating one embodiment of the interrelationship between the spur detector, spur tracker and spur cancellation unit employed in the system of FIG. 1.

FIG. 2 illustrates one example of an interrelationship between the spur detector 114, the spur tracker 115 and the spur cancellation unit 118. The spur cancellation unit 118 in one embodiment may take the form of a distributed set of notch filters SEC 202a-202n that receive an input signal "Input" and selectively pass portions of the input signal through a multiplexer 204 to a spur detection and tracking circuit (SDT) 206 that corresponds to the spur detector 114 and spur tracker 115 of FIG. 1. Each of the notch filters SEC 202a-202n may be programmed to exhibit a notch at an estimated or detected spur frequency so as to cancel the respective spur. In this example, the plurality of filters may provide the ability to track and cancel plural detected spurs.

Figure 3:
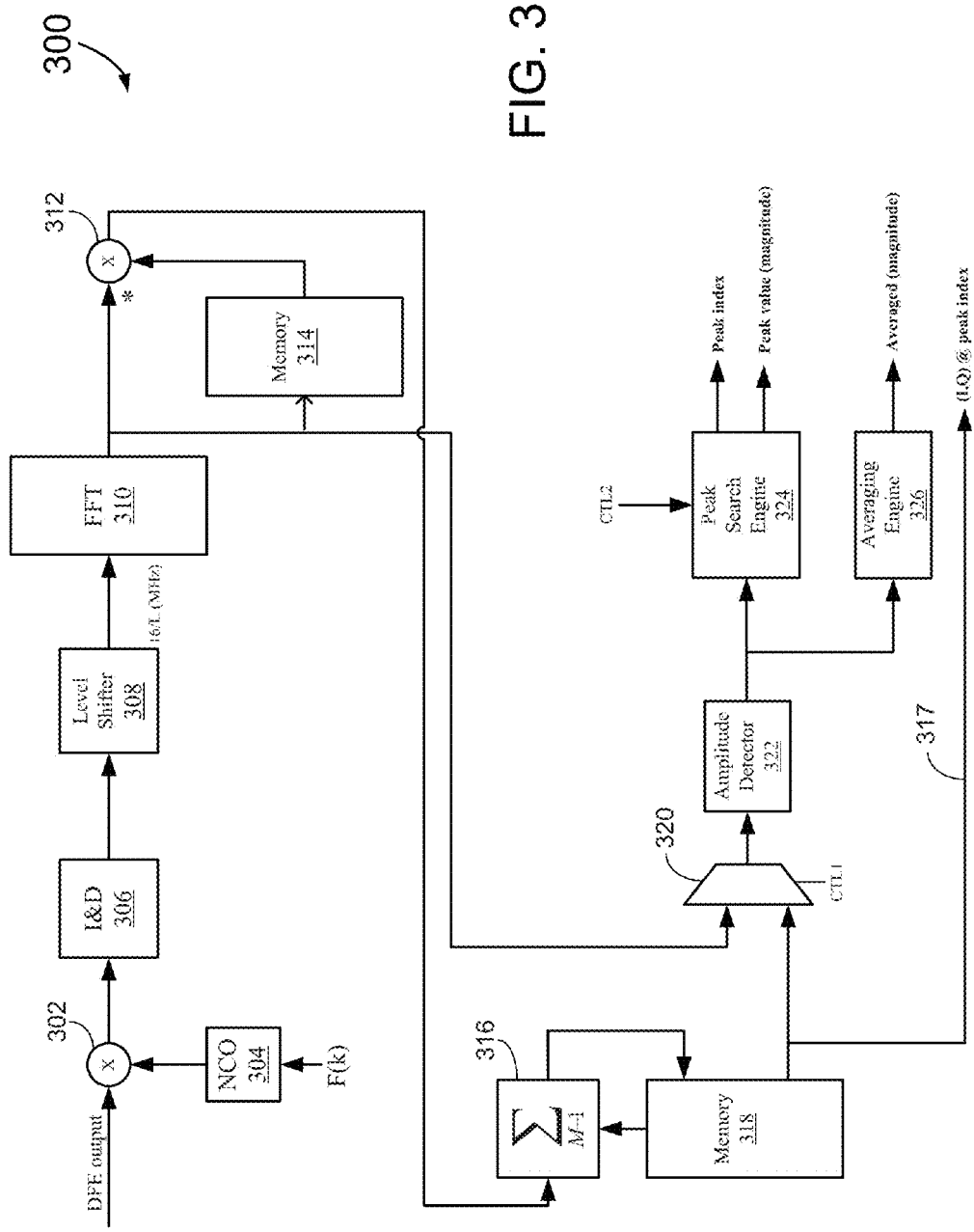
FIG. 3 illustrates the spur detector of FIG. 1 in detail, in accordance with one embodiment.

One embodiment of spur detector 114 of FIG. 1 is illustrated as a spur detector circuit 300 in FIG. 3. The spur detector circuit 300 may include a mixer 302 that receives input samples at a rate of, for example, 16 MHz from a digital front end (DFE output) (not shown). The mixer 302 also receives a mixer signal having a frequency that is synthesized from a master frequency F(k) fed to a numerically controlled oscillator (NCO) 304. The mixer signal frequency may be controlled via software according to a search algorithm more fully described below. Varying the mixer frequency allows for varying corresponding spur search windows (in terms of frequency bands) for spur detection and tracking.

To achieve higher spur detection sensitivity and improved spur frequency estimation precision, the mixed signal that is output from the mixer 302 may be supplemented by an integrate and dump (I&D) unit 306 that provides a variable decimation or down sampling function. This is, in effect, a form of low-pass filter that reduces the signal bandwidth in order to look at a reduced portion of the signal spectrum. In one embodiment, the variable decimation size may be represented by a value of 128 and/or 32, such that the bin size can be calculated from the relationship:

$$B_f = \frac{f_s}{2048L},$$

where L is a decimation value, $f_s$=16.48 MHz is the sampling frequency, and 2048 (8-bit input bit width) is the size of a fast Fourier transform engine (FFT) 310 which is more fully described below. Based on the relationship above, for larger decimation values of L, finer FFT bin resolution may be attained at a cost of reduced search range.

Further referring to FIG. 3, the integrate and dump unit 306 feeds a level shifter 308 that controls a programmable shift value n for the 8-bit input bit width into the FFT 310. In one embodiment, a default value of n may be expressed as n=round($\log_2\sqrt{L}$). Controlling the value of n allows for a trade-off between the spur detection sensitivity and maximum spur power tolerance. More specifically, a larger value of n results in a higher spur power tolerance but at a cost of less detection sensitivity. Exemplary shift values for n range from −2 to 5. In some embodiments, the level shifter output may be rounded to match the input size of the FFT 310. In one embodiment, the FFT 310 may employ an 8-bit input width for a range of 2048 points.

With continued reference to FIG. 3, in one embodiment, the FFT 310 feeds its output to a differential multiplier 312. The differential multiplier 312 takes the FFT output and also receives a value from a memory 314 that may be based on one or more previous FFT outputs. The differential multiplier 312 feeds its output to a coherent summer 316 having a second memory 318. The second memory 318 may accumulate the differential multiplication results, and may be implemented as one or more registers. Since the differential multiplication result is a complex number, it has I (in-phase) and Q (quadrature phase) components. A peak index, or best match, in terms of respective I and Q components for one of several spur detection results may be provided along a path 317. The differential multiplier 312 and coherent summer 316 together may perform the following function expressed by the relationship:

$$Z(i) = \sum_{m=1}^{M-1} y(m, i) \times conj(y(m - 1, i)),$$

where y(m,i) is the i-th frequency bin of the m-th FFT output, and Z(i) is the output of the differential summation over M−1 pairs. For example, if M=4, four samples are read in to form 3 pairs. In this way, the spur detector circuit 300, in one mode, is capable of carrying out a differential phase detection for highly accurate spur location identification.

In some instances, it may be desirable to utilize the output of the FFT 310 directly, rather than carrying out the differential multiplication and coherent summing. To allow for a selection between the direct output mode and the multiplied/summed output mode, a selector 320 may be provided. The selected output mode can generally depend on the desired sensitivity for spur detection. A control signal CTL1 fed to the selector 320 may provide for software selection of the desired mode.

Further referring to FIG. 3, the selected FFT output (whether fed directly or through the multiplier/summer) may be fed to an amplitude detector 322 which evaluates the in-phase I (magnitude) and quadrature phase Q (phase) components of the FFT output to estimate the received signal amplitude. In one embodiment, the amplitude may be estimated by the relationship:

$$\max(|I|,|Q|)+\text{floor}(0.5*\min(|I|,|Q|))$$

The amplitude value estimated by the amplitude detector 322 may then be fed to a peak search engine 324 and an averaging engine 326. In one embodiment, the peak search engine 324 may generate a peak value representing a magnitude parameter, and a peak index value that may be an integer from 0 to 2047. The averaging engine 326 may generate an averaged magnitude over, for example, 2048 of the FFT sub-carriers. With these values, system software may calculate the peak-to-average-power-ratio (PAPR) in terms of the peak value (magnitude)/mean value (magnitude) to determine if the corresponding frequency is a spur.

Figure 4:
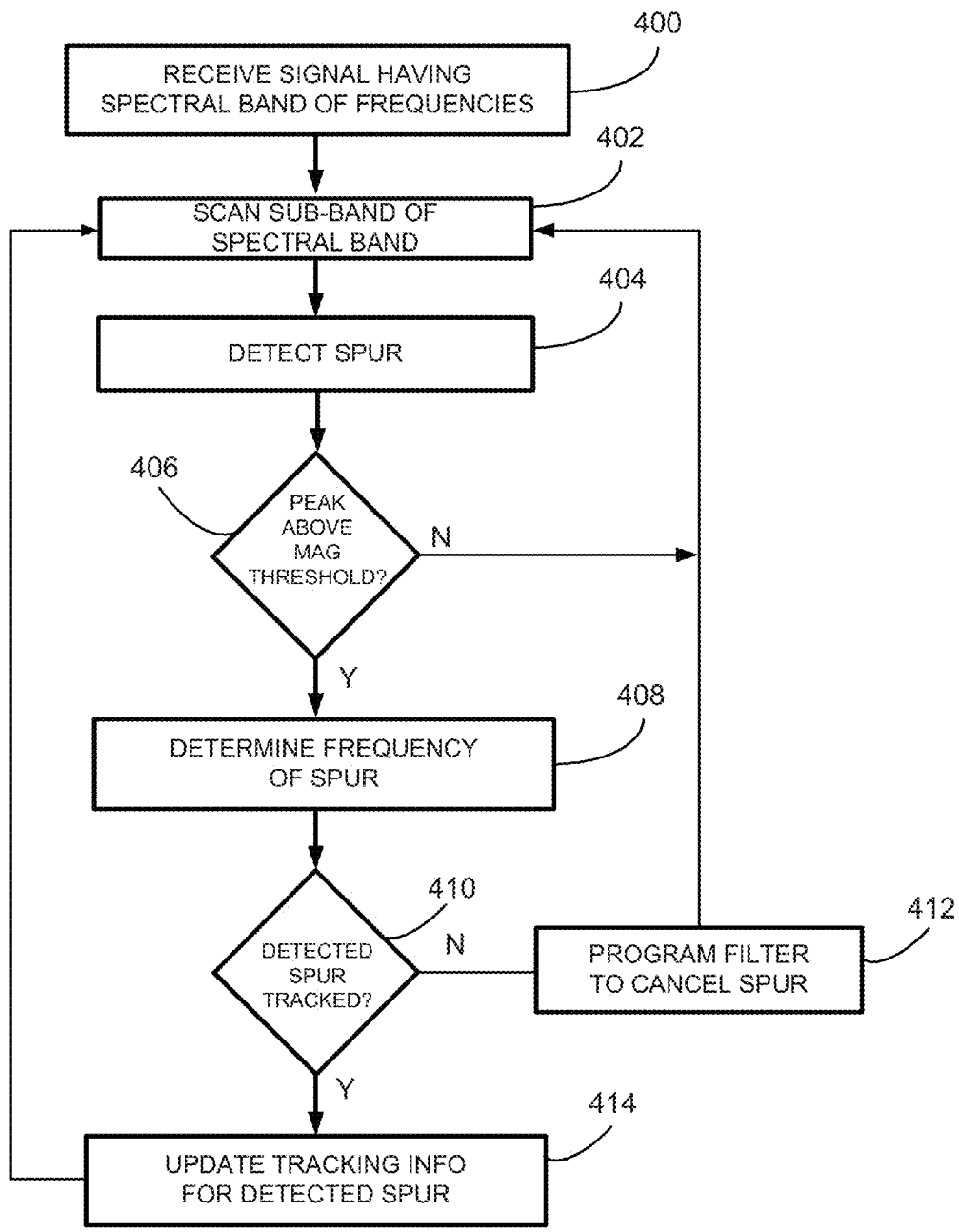
FIG. 4 shows a high-level flowchart illustrating a method of operation of the system of FIG. 1, in accordance with one embodiment.

In operation, the hardware and corresponding software of FIGS. 1-3 may cooperate with an intelligent software platform to employ search schemes that detect, cancel and track spurs. Depending on the type of mobile device being operated, for example, the software platform may control a sequence of operations to search for, detect, track and cancel spurs. FIG. 4 illustrates steps involved in one method of operation. As the receiver 108 (FIG. 1) receives signals exhibiting a given spectral band, at step 400, a selected set of sub-bands of frequencies may be scanned by the spur detector 114, at step 402. The sub-band selection may be based on a variety of criteria, including the desired sensitivity of spur detection and the acceptable duration for spur detection. The sensitivity criteria may be based on the signaling environment of the receiver 108 and known reception conditions and other environmental variables (typical interfering devices nearby, common spur frequencies, etc.).

Once a spur is detected, at step 404, a determination may be made whether the magnitude of the peak energy associated with the spur is greater than a predetermined peak threshold, at step 406. If so, the spur cancellation unit 118 may be programmed to cancel the detected spur before the detection process continues with the other sub-bands. This enables the method to first address higher-magnitude spurs, which may beneficially address aliasing issues associated with smaller spurs having frequencies near the larger spurs. If the spur magnitude is below the threshold, operation may resume with scanning another sub-band, at 402, and iteratively repeating the detection steps. If the spur magnitude lies above the threshold, then the spur frequency may be determined through an estimation process, at step 408.

Once the spur frequency is identified, an evaluation may be carried out as to whether the spur is currently being tracked, at step 410. If not, a cancellation unit in the spur cancellation unit 118 may be programmed, at step 412, to remove the spur at the detected frequency so that the resulting signal is cleaned. If the spur is currently being tracked, then any changes in the frequency, phase or magnitude characteristics of the spur may be updated into system memory, at step 414. The search algorithm may then iterate to a new search sub-band or bin, at step 402.

Figure 5:
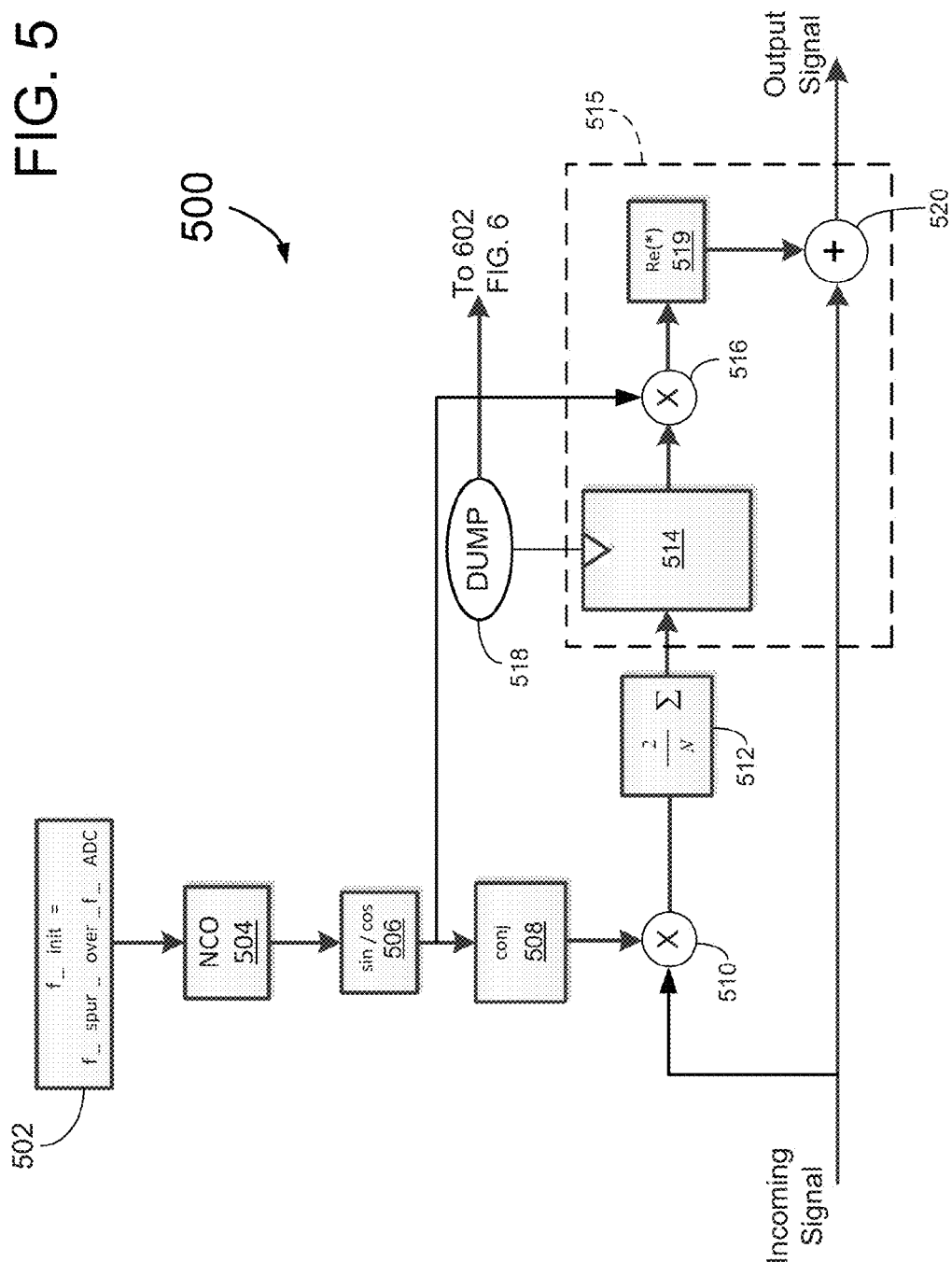
FIG. 5 illustrates one embodiment of the estimation logic employed in the spur cancellation unit of FIG. 1.

FIG. 5 illustrates an estimation circuit, generally designated 500, that forms a part of a further embodiment of a spur detection and tracking circuit (SDT). Assuming that the spur is a single tone, its amplitude and phase may be first estimated. The spur may then be reconstructed and subtracted out. Although phase noise may smear the spur and create a "skirt" around the tone, the residual error after cancelling the single tone is negligible. This may be handled as an alternative to passing the signal through a notch filter since it may be very difficult to build a narrow notch filter without distorting the signal when the notch is in-band.

Further referring to FIG. 5, an initial spur estimated frequency value, at 502, may be fed to a numerically controlled oscillator (NCO) 504. The NCO may be used to generate the phase of the spur. In one embodiment, the maximum sample rate of the SEC circuit may be approximately 32 MHz. For a target frequency error of 0.01 Hz (i.e. 3.6 degrees of phase error in 1 second), one embodiment may utilize 32 bits. The spur frequency may be signed and may be limited in frequency to no greater than half the sample frequency.

To achieve a clean cancellation (where a residual is less than −130 dBm), accurate estimations of the spur amplitude and phase may be made. The frequency from the NCO 504 may be passed to a sine/cosine (sin/cos) table 506. The resulting spur phasor may then be conjugated at conjugate block (conj) 508, and the conjugate multiplied with the spur in the incoming signal, at multiplier 510. The output of the multiplier 510 may be expressed by the relationship:

$$y(t) = a\cos(\omega t + \theta)\exp(-j\omega t)$$
$$= a/2(\exp(j(\omega + \theta)) + \exp(-j(\omega t + \theta)))\exp(-j\omega t)$$
$$= a/2(\exp(j\theta) + \exp(-j(2\omega t + \theta)))$$

With continued reference to FIG. 5, the output of the multiplier 510 may then be fed to an averaging circuit 512, and averaged over a large block size, such as N=4096 samples. As a result, the second term of the multiplier output diminishes, and the result represents the amplitude and phase of the spur, or $a\exp(j\theta)$. To cancel the spur, the complex value may be fed to a cancellation sub-module 515 that includes a gate 514 and multiplier 516. A box filter (DUMP) 518 is coupled to the gate 514. The complex value is multiplied with the spur phasor, and the real part obtained, a $\cos(\omega t+\theta)$ by a real part extraction circuit 519. This value represents the reconstructed spur, which may then be fed to a summing circuit 520 to cancel out the spur in the incoming signal.

Figure 6:
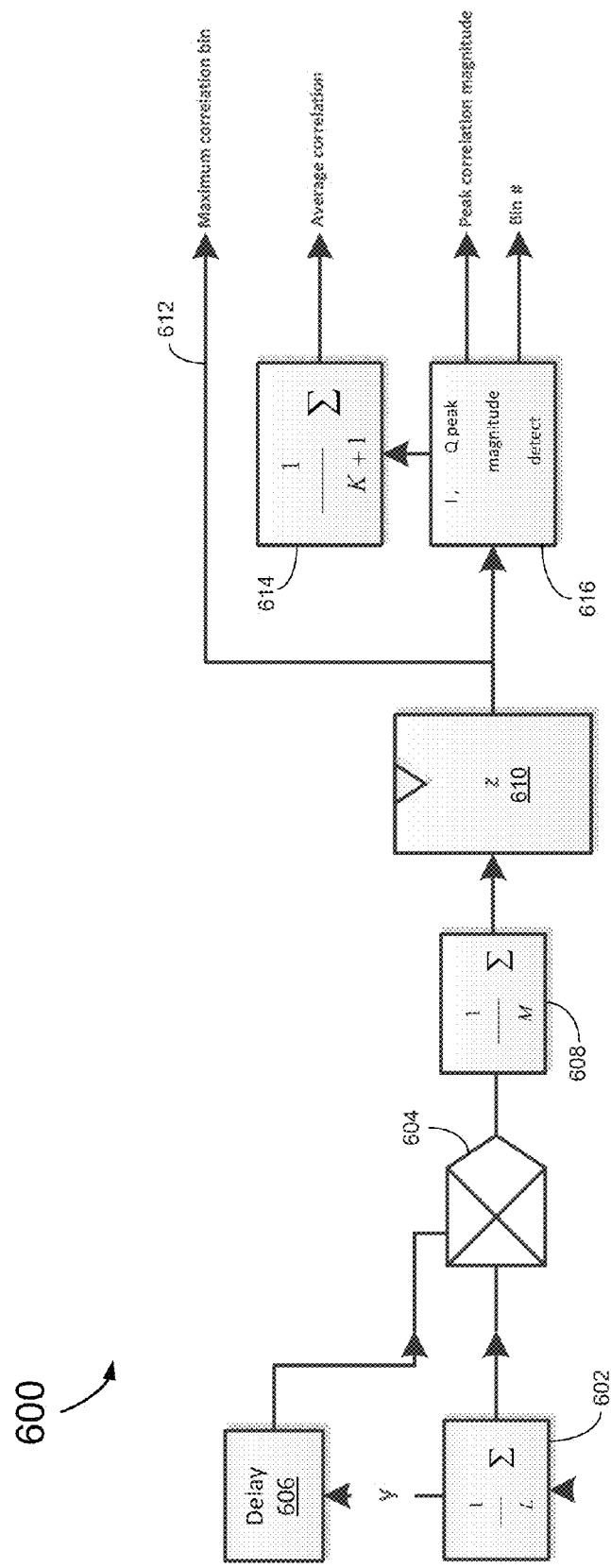
FIG. 6 illustrates one embodiment of the spur detector and spur tracker of FIG. 1.

FIG. 6 illustrates a spur detection and tracking circuit, generally designated 600, that may cooperate with the estimation circuit 500 of FIG. 5 to provide enhanced sensitivity for detecting low-power spurs. The enhanced sensitivity may be realized through use of a differential detection technique that evaluates two outputs from an FFT that have different phases associated with them. The difference in phase corresponds to the frequency width of the tone.

Further referring to FIG. 6, the output from the box filter 518 (FIG. 5) may be fed to the input of another filter 602 that generates an averaged value of x(I) over L repetitions of estimation. This may improve the signal to noise ratio of the estimate, and spur detection/tracking sensitivity. The output y may be calculated by the relationship $$y(m) = \frac{1}{L}\sum_{l=(m-1)L+1}^{mL} x(l) \approx \frac{1}{NL}\sum_{n=(m-1)NL+1}^{mNL} e^{j(2\pi(f_{est}-f_{spur})nT_s+\theta)}$$

The output of the filter 602 may then be fed to a differential multiplier 604. The differential multiplier takes the direct output and a delayed version of the output from a delay element 606 and may generate a differential product. The result is a computation of a self-correlation of the spur estimate, and an angle extraction that contains information of the spur frequency error. Further, the differential product value eliminates any unknown phase component associated with the differential signal components.

To achieve a better signal-to-noise ratio, the output of the differential multiplier 604 may be fed to a differential summation and averaging circuit 608. The circuit may be controlled by a factor M that may be generated by software. The output may be calculated by the equation:

$$z(k) = \frac{1}{M}\sum_{m=1}^{M} y(m)y^*(m-1) \approx e^{j2\pi(f_{est}-f_{spur})NLT_s}$$

By calculating the angle of z(k), one can determine an estimated spur frequency error $f_e$ as $$f_e = f_{est} - f_{spur} \approx \frac{\text{angle}(z(k))}{2\pi NLT_s}$$

With the determined spur frequency error, tracking the spur may be carried out by updating an estimated spur frequency based on the current frequency error.

With continued reference to FIG. 6, a register 610 may receive the output of the differential summation and averaging circuit 608. In one embodiment, the register 610 triggers an interrupt signal to inform the software of the spur frequency identification. The output from the register 610 may be used directly as a maximum correlation value, at 612, and may be fed to a peak detection circuit 616 for respective peak I (in-phase) and Q (quadrature phase) magnitude values. The peak detection circuit 616 may feed the output from the register 610 to an averaging circuit 614 to generate average correlation values.

As noted above with respect to the steps of FIG. 4, the search algorithm for mapping detected spurs may involve iteratively scanning multiple windows or bins for spurs. One embodiment may prioritize the detection of high-power spurs first in order to avoid aliasing effects. High-power spurs may need less detection sensitivity associated with them, so a wider band of frequencies may be scanned for a given search. In contrast, low-power spurs may need higher detection sensitivity, and so a narrower band of frequencies may be scanned accordingly.

Figure 7:
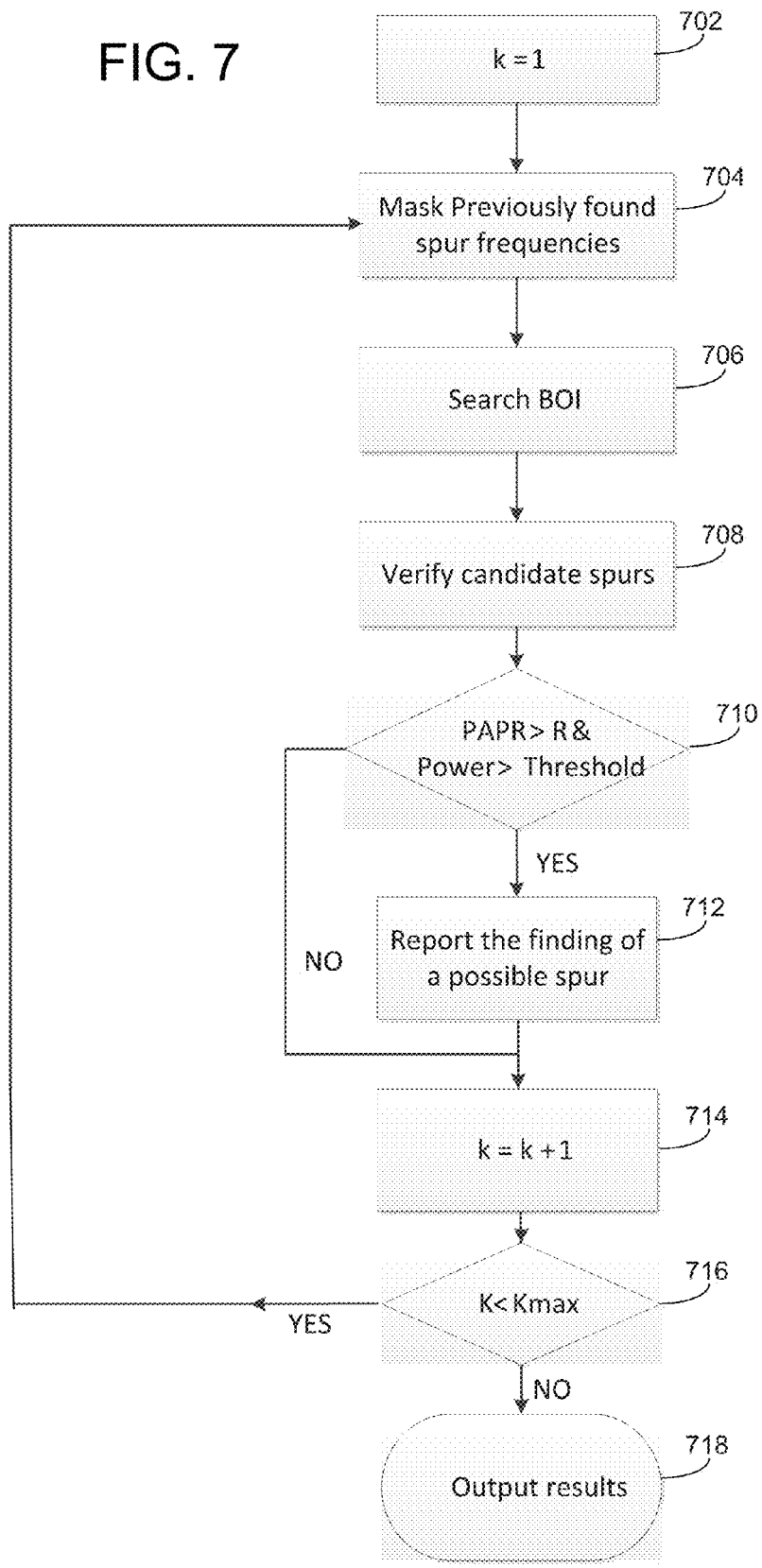
FIG. 7 illustrates one embodiment of the mapping step of FIG. 4.

FIG. 7 illustrates a more detailed series of steps involved in searching for the spurs of interest. The method begins by first setting a counter to a default value to track a number of search iterations or mapping runs, at 702. The number of mapping runs for the algorithm may be one, or a higher value depending on the application. Previously identified spur frequencies may then be masked to minimize the chance of re-detection, at 704. For one embodiment, the masking may involve disabling a narrow frequency band centered on the detected spur.

Further referring to FIG. 7, after masking, a bin of interest (BOI) may be searched, at 706. The bin of interest may involve a pre-programmed set of sub-band parameters such as, for example, 8 MHz for an initial strong-power search mapping, followed by 2 MHz for a medium-power mapping, and 64 KHz for weak-power mapping when the frequency of the spur is roughly known. During the search stage, according to a measured signal power, multiple numbers of candidate frequencies with top power may be recorded and sent to a verify stage for further confirmation of detection.

Upon receiving spur candidates, a verification may be carried out, at 708 that involves examining the spur candidates one-by-one through an analysis of a peak-to-average-power-ratio (PAPR) of the sub band and a peak power value of the sub band, at 710. Verification may involve reducing the search window for a given spur, and increasing the sensitivity to confirm that the detected spur is not an anomaly. During the verification, the searched spurs may only be deemed valid if (1) the PAPR of the sub-band containing the spurs is higher than a certain threshold, denoted by R, and (2) the power of the detected spur is higher than a threshold $P_{spur}$. Both thresholds R and $P_{spur}$ may be programmed values. Also, the verification is executed for a maximum number of spurs, $K_{max}$, that is dictated by the number of spur cancellation and tracking units in the system.

Further referring to FIG. 7, after the candidate spurs are verified and exceed the power threshold, the detection circuit may report a finding of a possible spur, at 712. A spur counter value may then be incremented, at 714, and a determination may be made as to whether the number of detected spurs exceeds the maximum value $K_{max}$, at 716. If the threshold is not exceeded, no report is made, and operation may iterate back to the masking step 704. If the count value exceeds the maximum count $K_{max}$, then the results of the search routine may be output to the spur cancellation unit, at 718 such that the detected spur frequencies are identified for cancellation by the notch filter circuitry.

Figure 8:
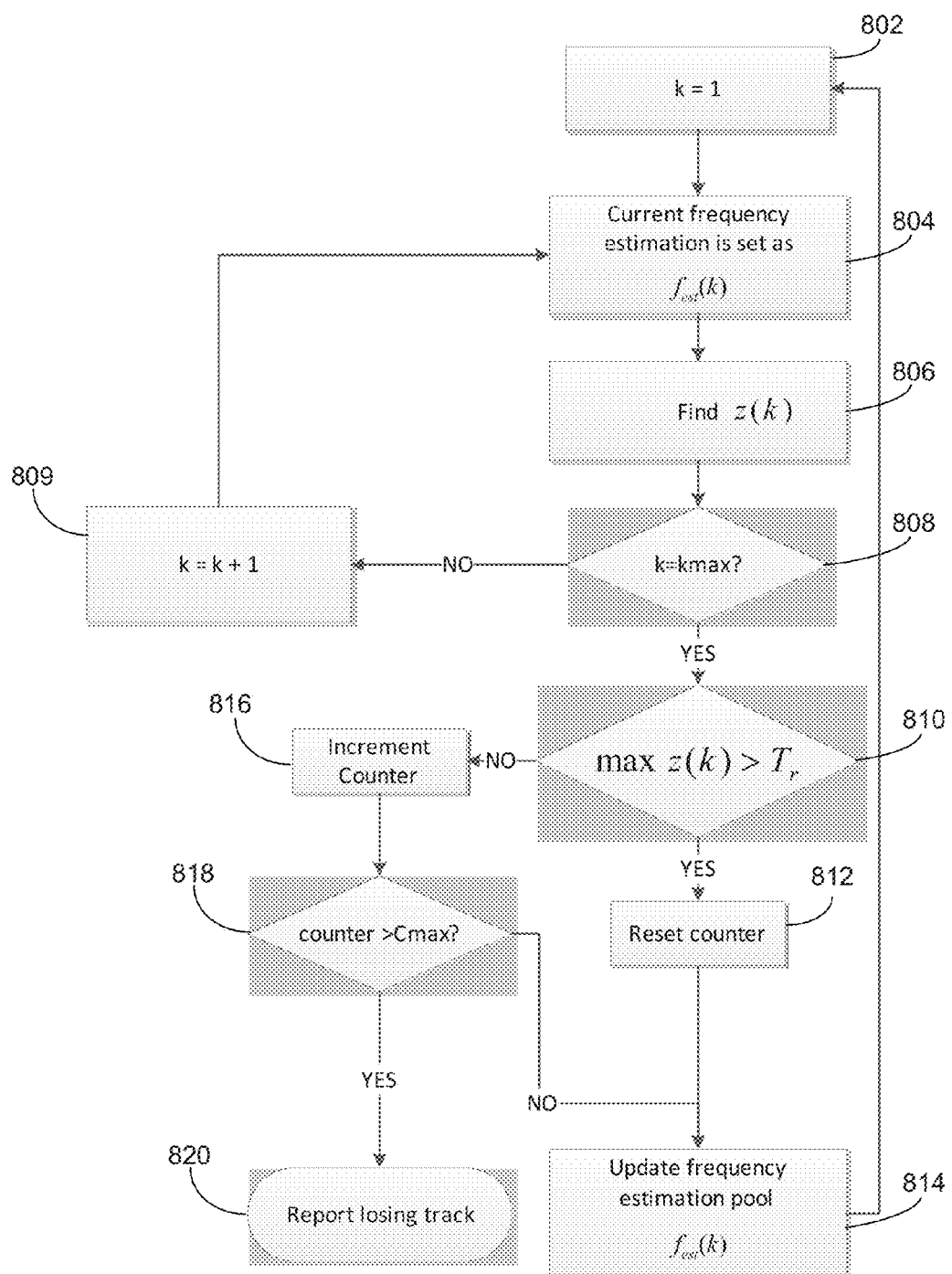
FIG. 8 illustrates one embodiment of the tracking step of FIG. 4.

Referring to FIG. 8, the spur detection and tracking circuit may employ a counter to record the tracking history. The process begins by setting the counter to a default value, such as 1, at 802. A current estimation frequency $f_{est}(k)$ may be set, at 804. The outputs of the differential summing and averaging circuit corresponding to the frequency estimates may then be identified as z(k), at 806. A determination may then be made as to whether the count value is at a maximum value $K_{max}$, at 808. If not, then the counter may be incremented, at 809, and the frequency re-estimated, at 804. If the counter value exceeds $K_{max}$, then a further determination may be made, at 810, as to whether the maximum value of the estimated frequency z(k) is higher than a predetermined threshold Tr. If so, then the tracking may be viewed as successful, and the counter reset, at 812, and the frequency estimation pool $f_{est}(k)$ updated, at 814.

Further referring to FIG. 8, if the maximum value of the estimated frequency z(k) is less than the threshold Tr, then the current tracking cycle may have failed, and the counter is incremented, at 816. The counter value may then be evaluated, at 818, to determine whether it is higher than a predetermined count value Cmax. If so, the counter overflow is triggered and the tracking may be viewed as failed, with a report of a loss of tracking generated at 820. If the counter is not higher than Cmax, then the frequency estimation pool may be updated, at 814.

Referring now to FIG. 9, a result of the method described in FIG. 8 may be illustrated graphically, with the estimated frequency fest (the center of the frequency bin) bounded by two nulls at $(f_{est}-0.6/NLT_s)$ and $(f_{est}+0.6/NLT_s)$. As explained above, in an effort to increase the detection and tracking ranging of the detection and tracking circuitry, a plurality $n*K_{max}$ of bins may be searched, spanning from the estimated frequency $f_{est}$. In some embodiments, as shown in FIG. 9, the bins may be overlapped by a specified percentage, such as 40-50% to achieve desired detection sensitivity. In some embodiments, the value of $n*K_{max}$ may be an odd value, and the middle bin may be centered at the estimated frequency $f_{est}$.

In one embodiment, a number n of bins may be tracked, spanning from an estimated frequency $f_{est}$. In some instances, the bins may be overlapped to achieve better detection sensitivity. For one example, each of the n frequency bins may be spaced apart by a predefined value (based on the reciprocal of a total coherent integration time generated by a differential summation circuit, described below). This may increase the detection and tracking range of the circuit. In one example, a 40% overlap may be employed, resulting in each of the n frequency bins having a $$\frac{1}{NLT_s}$$

Hz null-to-null width, and spaced $$\frac{0.6}{NLT_s}$$

Hz apart. The value of n may be an odd value, and the middle bin may be centered at $f_{est}$.

In one specific example, where n=3, three frequency estimates are checked:

$$\left\{ f - \frac{0.6}{NLT_s}, f_{est}, f_{est} + \frac{0.6}{NLT_s} \right\},$$

and the corresponding outputs of the differential summation and average circuit calculated, denoted by z(k), k=1, 2, ..., $n_{max}$. The multiple frequency estimates are referred to as a frequency estimation pool centered at $f_{est}$.

Those skilled in the art will appreciate that the proposed schemes thus provide detection and tracking of spur frequencies in an efficient and accurate manner.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of processing spur components associated with a wireless signal, the method comprising:
    selecting a sub-band of a received signal;
    determining a first Fast Fourier Transform (FFT) based, at least in part, on the selected sub-band, the first FFT including a number of frequency bins;
    determining a first differential product for each frequency bin of the first FFT based, at least in part, on the first FFT and a complex conjugate of a second FFT based, at least in part, on the selected sub-band; and
    determining a spur frequency based, at least in part, on the first differential product.

2. The method of claim 1, further comprising:
    cancelling a spur based on the determined spur frequency; and
    tracking the determined spur frequency over time.

3. The method of claim 2, wherein the tracking comprises:
    storing initial information associated with the spur;
    detecting any frequency changes associated with the spur; and
    updating the initial information to reflect the detected frequency changes.

4. The method of claim 1, wherein the first differential product is a complex product of the first FFT and the complex conjugate of the second FFT.

5. The method of claim 1, wherein the second FFT is determined after the first FFT is determined.

6. The method of claim 1, wherein determining the spur frequency comprises:
    determining a coherent sum for each frequency bin of the first FFT based, at least in part, on the first differential product associated with each frequency bin and a second differential product associated with each frequency bin; and
    selecting the spur frequency based, at least in part, on an average coherent sum and a peak coherent sum, wherein the average coherent sum is an average value of the coherent sums associated with each frequency bin and the peak coherent sum is a largest coherent sum selected from the coherent sums associated with each frequency bin.

7. The method of claim 6, wherein the coherent sum is a complex sum of the first differential product and the second differential product, and the second differential product is based, at least in part, on the second FFT and a complex conjugate of a third FFT based, at least in part, on the selected sub-band.

8. The method of claim 7, wherein the third FFT is determined after the first FFT and the second FFT are determined.

9. The method of claim 6, wherein the spur frequency is associated with the peak coherent sum that is greater than a threshold.

10. The method of claim 6, wherein the spur frequency is associated with the peak coherent sum that exceeds the average coherent sum by at least a threshold amount.

11. A receiver, comprising:
    a radio frequency (RF) front end to receive a signal; and
    a baseband processor to:
        select a sub-band of the received signal;
        determine a first Fast Fourier Transform (FFT) based, at least in part, on the selected sub-band, the first FFT including a number of frequency bins;
        determine a first differential product for each frequency bin of the first FFT based, at least in part, on the first FFT, and a complex conjugate of a second FFT based, at least in part, on the selected sub-band, wherein the second FFT is determined after the first FFT is determined; and
        determine a spur frequency based, at least in part, on the first differential product.

12. The receiver of claim 11, wherein the baseband processor is to determine the frequency spur by:
    determining a coherent sum for each frequency bin of the first FFT based, at least in part, on the first differential product associated with each frequency bin and a second differential product associated with each frequency bin; and
    selecting the spur frequency based, at least in part, on an average coherent sum and a peak coherent sum, wherein the average coherent sum is an average value of the coherent sums associated with each frequency bin and the peak coherent sum is a largest coherent sum selected from the coherent sums associated with each frequency bin.

13. The receiver of claim 12, wherein the coherent sum is a complex sum of the first differential product and the second differential product.

14. The receiver of claim 12, where the spur frequency is associated with the peak coherent sum that is greater than a threshold.

15. The receiver of claim 12, where the spur frequency is associated with the peak coherent sum that exceeds the average coherent sum by at least a threshold amount.

16. A device for processing spur components associated with a wireless signal, the device comprising:
   means for selecting a sub-band of a received signal;
   means for determining a first Fast Fourier Transform (FFT) based, at least in part, on the selected sub-band, the first FFT including a number of frequency bins;
   means for determining a first differential product for each frequency bin of the first FFT based, at least in part, on the first FFT and a complex conjugate of a second FFT based, at least in part, on the selected sub-band, wherein the second FFT is determined after the first FFT is determined; and
   means for determining a spur frequency based, at least in part, on the first differential product.

17. The device of claim 16, further comprising:
   means for cancelling a spur based on the determined spur frequency; and
   means for tracking the determined spur frequency over time.

18. The device of claim 16, wherein means for determining the spur frequency further comprises:
   means for determining a coherent sum for each frequency bin of the first FFT based, at least in part, on the first differential product associated with each frequency bin and a second differential product associated with each frequency bin, wherein the coherent sum is a complex sum of the first differential product and the second differential product; and
   means for selecting the spur frequency based, at least in part, on an average coherent sum and a peak coherent sum, wherein the average coherent sum is an average value of the coherent sums associated with each frequency bin and the peak coherent sum is a largest coherent sum selected from the coherent sums associated with each frequency bin.

19. The device of claim 18, wherein the spur frequency is associated with the peak coherent sum that is greater than a threshold.

20. The device of claim 18, wherein the spur frequency is associated with the peak coherent sum that exceeds the average coherent sum by at least a threshold amount.

* * * * *